US008838754B1

(12) United States Patent
Rao

(10) Patent No.: US 8,838,754 B1
(45) Date of Patent: Sep. 16, 2014

(54) MOBILE DEVICE WITH A MANAGEMENT FOREST IN A DEVICE MANAGEMENT NETWORK

(75) Inventor: Bindu Rama Rao, Laguna Niguel, CA (US)

(73) Assignee: QUALCOMM Incorporated, San Diego, CA (US)

(*) Notice: Subject to any disclaimer, the term of this patent is extended or adjusted under 35 U.S.C. 154(b) by 2632 days.

(21) Appl. No.: 11/043,813

(22) Filed: Jan. 26, 2005

Related U.S. Application Data

(60) Provisional application No. 60/539,535, filed on Jan. 26, 2004.

(51) Int. Cl.
*G06F 15/177* (2006.01)

(52) U.S. Cl.
USPC .......................................................... 709/221

(58) Field of Classification Search
USPC ................................ 709/220, 221; 3/220, 221
See application file for complete search history.

(56) References Cited

U.S. PATENT DOCUMENTS

| 5,261,055 A | 11/1993 | Moran et al. |
|---|---|---|
| 5,442,771 A | 8/1995 | Filepp et al. |
| 5,479,637 A | 12/1995 | Lisimaque et al. |
| 5,579,522 A | 11/1996 | Christeson et al. |
| 5,596,738 A | 1/1997 | Pope |
| 5,598,534 A | 1/1997 | Haas |
| 5,608,910 A | 3/1997 | Shimakura |
| 5,623,604 A | 4/1997 | Russell et al. |
| 5,666,293 A | 9/1997 | Metz et al. |
| 5,752,039 A | 5/1998 | Tanimura |
| 5,778,440 A | 7/1998 | Yiu et al. |
| 5,790,974 A | 8/1998 | Tognazzini |
| 5,878,256 A | 3/1999 | Bealkowski et al. |
| 5,960,445 A | 9/1999 | Tamori et al. |
| 6,009,497 A | 12/1999 | Wells et al. |
| 6,038,636 A | 3/2000 | Brown, III et al. |
| 6,064,814 A | 5/2000 | Capriles et al. |

(Continued)

FOREIGN PATENT DOCUMENTS

| CA | 2339923 A | 3/2000 |
|---|---|---|
| JP | 8202626 A | 8/1996 |
| KR | 2002-0034228 A1 | 5/2000 |
| KR | 2001-0100328 A1 | 11/2001 |

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner* — Jason Recek
(74) *Attorney, Agent, or Firm* — Kilpatrick Townsend & Stockton LLP

(57) ABSTRACT

A mobile handset network employs a device management server/gateway to manage a plurality of management trees in a mobile electronic device such as mobile handset or personal digital assistant. Each of the management trees in the mobile electronic device may be associated and managed by a different management authority in the device management (DM) network such as, for example, a device manufacturer DM-server, a network operator DM-server, and a service provider DM-server. Each of the management authorities in the mobile handset network are capable of provisioning, replacing, modifying and/or deleting the associated one of the plurality of management trees in the mobile device, by employing a device management client resident in the mobile electronic device.

20 Claims, 2 Drawing Sheets

(56) References Cited

U.S. PATENT DOCUMENTS

| | | | |
|---|---|---|---|
| 6,073,206 | A | 6/2000 | Piwonka et al. |
| 6,073,214 | A | 6/2000 | Fawcett |
| 6,088,759 | A | 7/2000 | Hasbun et al. |
| 6,105,063 | A | 8/2000 | Hayes, Jr. |
| 6,112,024 | A | 8/2000 | Almond et al. |
| 6,112,197 | A | 8/2000 | Chatterjee et al. |
| 6,126,327 | A | 10/2000 | Bi et al. |
| 6,128,695 | A | 10/2000 | Estakhri et al. |
| 6,157,559 | A | 12/2000 | Yoo |
| 6,163,274 | A | 12/2000 | Lindgren |
| 6,198,946 | B1 | 3/2001 | Shin et al. |
| 6,279,153 | B1 | 8/2001 | Bi et al. |
| 6,311,322 | B1 | 10/2001 | Ikeda et al. |
| 6,438,585 | B2 | 8/2002 | Mousseau et al. |
| 7,007,049 | B2 * | 2/2006 | Peng ............... 707/205 |
| 7,292,846 | B2 * | 11/2007 | Mittal ............... 455/418 |
| 2001/0029178 | A1 | 10/2001 | Criss et al. |
| 2001/0047363 | A1 | 11/2001 | Peng |
| 2001/0048728 | A1 | 12/2001 | Peng |
| 2002/0078209 | A1 | 6/2002 | Peng |
| 2002/0116261 | A1 | 8/2002 | Moskowitz et al. |
| 2002/0131404 | A1 | 9/2002 | Mehta et al. |
| 2002/0152005 | A1 | 10/2002 | Bagnordi |
| 2002/0156863 | A1 | 10/2002 | Peng |
| 2002/0157090 | A1 | 10/2002 | Anton, Jr. |
| 2003/0033599 | A1 | 2/2003 | Rajaram et al. |
| 2003/0037075 | A1 | 2/2003 | Hannigan et al. |
| 2003/0061384 | A1 | 3/2003 | Nakatani |
| 2003/0103484 | A1 * | 6/2003 | Oommen et al. ........ 370/338 |
| 2003/0182414 | A1 * | 9/2003 | O'Neill ............... 709/223 |
| 2004/0093523 | A1 * | 5/2004 | Matsuzaki et al. ...... 713/201 |
| 2004/0158583 | A1 * | 8/2004 | Kaappa ............... 707/104.1 |
| 2004/0192280 | A1 * | 9/2004 | Dalton et al. .......... 455/418 |
| 2004/0215702 | A1 * | 10/2004 | Hamasaki et al. ...... 709/201 |
| 2004/0229684 | A1 * | 11/2004 | Blackburn et al. ...... 463/29 |
| 2005/0055453 | A1 * | 3/2005 | Zhu .................. 709/230 |
| 2005/0066019 | A1 * | 3/2005 | Egan et al. ........... 709/223 |
| 2005/0172117 | A1 * | 8/2005 | Aura ................ 713/155 |
| 2006/0010437 | A1 * | 1/2006 | Marolia .............. 717/168 |
| 2006/0130046 | A1 * | 6/2006 | O'Neill ............... 717/168 |
| 2006/0258344 | A1 * | 11/2006 | Chen ................ 455/419 |
| 2007/0277169 | A1 * | 11/2007 | Rao et al. ............ 717/173 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1$^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

MOBILE DEVICE WITH A MANAGEMENT FOREST IN A DEVICE MANAGEMENT NETWORK

RELATED APPLICATIONS

The present application makes reference to, claims priority to, and claims the benefit of U.S. Provisional Patent Application Ser. No. 60/539,535, entitled "Mobile Device with a Management Forest in a Device Management Network", filed Jan. 26, 2004, the complete subject matter of which is hereby incorporated herein by reference, in its entirety.

The present application also makes reference to U.S. Provisional Patent Application Ser. No. 60/479,268, entitled "Management Tree Management in Mobile Handset", filed Jun. 18, 2003, the complete subject matter of which is hereby incorporated herein by reference, in its entirety.

The present application also makes reference to PCT Application having publication number WO/02/41147 A1 and PCT Application No. PCT/US01/44034, entitled "System and Method for Updating and Distributing Information", filed Nov. 19, 2001, the complete subject matter of which is hereby incorporated herein by reference, in its entirety.

The present application also makes reference to U.S. Provisional Patent Application Ser. No. 60/249,606, entitled "System and Method for Updating and Distributing Information", filed Nov. 17, 2000, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

There is a problem with managing the millions of devices that need firmware upgrades and the provisioning of applications. There is a problem in determining the existing firmware version of devices and mapping them to device capabilities. In some deployments, it is often not clear what the end points are, and providing end-to-end security is often not possible. Servers are often subject to replay attacks. Security systems need to be able to guard against replay attacks, etc.

In general, more than management server may wish to manage the mobile device. How these management servers can manage the mobile device when there is only one management tree to be managed in the device is a fundamental problem. Access control lists (ACLs) are expected to be the means by which a primary management server can provide access to parts of a management tree to other management servers. However, if more than one management server is to be a primary management server, there is problem of deciding which one of these should own the rights to manage the root node.

In general, having one management tree and a plurality of management servers that need to manage information on the tree makes it difficult and complicated to manage access rights. This problem is exacerbated when each management server decides of provision different set of credentials in the mobile device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a system supporting management of device management information in a plurality of mobile electronic devices. Such a system may comprise at least one device management authority for communicating with the plurality of mobile electronic devices, and each of the plurality of mobile electronic devices may comprise an associated device management tree for each of the at least one device management authority. In a representative embodiment of the present invention, each of the at least one device management authority may manage associated device management trees in the plurality of mobile electronic devices, and may employ a unique set of credentials to manage associated device management trees. The credentials may be employed in a public key mechanism. In addition, each of the at least one device management authority may manage associated device management trees via a device management server, and each of the at least one device management authority may interact with the device management server employing web services interfaces to manage associated device management trees. Each of the at least one device management authority may manage a particular service accessed by the plurality of mobile electronic devices by managing associated device management trees in the plurality of mobile electronic devices, and a device management authority not associated with a device management tree may be prevented from at least one of accessing, updating, creating, deleting, and modifying the device management tree.

In a representative embodiment of the present invention, the plurality of mobile electronic devices may each comprise a device management client associated with one of the at least one device management authority. Each device management tree may comprise at least one of a firmware object, a software object, data, and a parameter related to the operation of the associated mobile electronic device. In various representative embodiments of the present invention, the plurality of mobile electronic devices may comprise at least one of a mobile handset, a personal digital assistant, a personal computer, a pager. The communicating may employ at least one of a cellular communication network, a personal communications services (PCS) network, a paging network, a personal area network, and a wireless local area network.

Additional aspects of the present invention may be observed in a mobile electronic device comprising at least one device management client for managing objects in an associated device management tree, and at least one credential associated the at least one device management client. Each device management client may be capable of at least one of accessing, updating, creating, deleting, and modifying objects in the associated device management tree based upon communication with an associated device management server using the at least one credential. The at least one credential may enable authentication of the at least one device management client and the associated device management server, and the authentication may employ a public key mechanism. The objects may comprise at least one of a firmware object, a software object, a data object, and a parameter related to the operation of the mobile electronic device. The communication may be accomplished via one of a cellular communication network, a personal communications services (PCS) network, a paging network, a personal area network, and a wireless local area network. In a representative embodiment of the present invention, the mobile electronic device may also comprise a data structure comprising at least one reference to a device management tree. A device management server may be enabled for at least one of accessing, updating, creating, deleting, and modifying at least two device management trees on a single mobile electronic device. In various representative embodiments of the present invention, the mobile electronic device may comprise one of a mobile handset, a personal digital assistant, a personal computer, and a pager.

These and other advantages, aspects and novel features of the present invention, as well as details of an illustrated embodiment thereof, will be more fully understood from the following description and drawings.

DETAILED DESCRIPTION OF THE INVENTION

The present invention relates generally to the update of firmware and/or software components in mobile electronic devices such as mobile handsets using a device management solution and, more specifically, to the use of a one or more device management servers as gateways for the provisioning of device management (DM) information in mobile electronic devices. As used herein, a mobile electronic device may comprise, for example, a mobile handset, a personal digital assistant, a personal computer, a pager, and similar portable electronic devices. The management of information may refer herein to accessing, updating, creating, deleting, and modifying information. Although the following discussion may make reference to the use of mobile handsets, representative embodiments may have application in a wide variety of mobile electronic devices such as the examples listed above.

Figure 1:
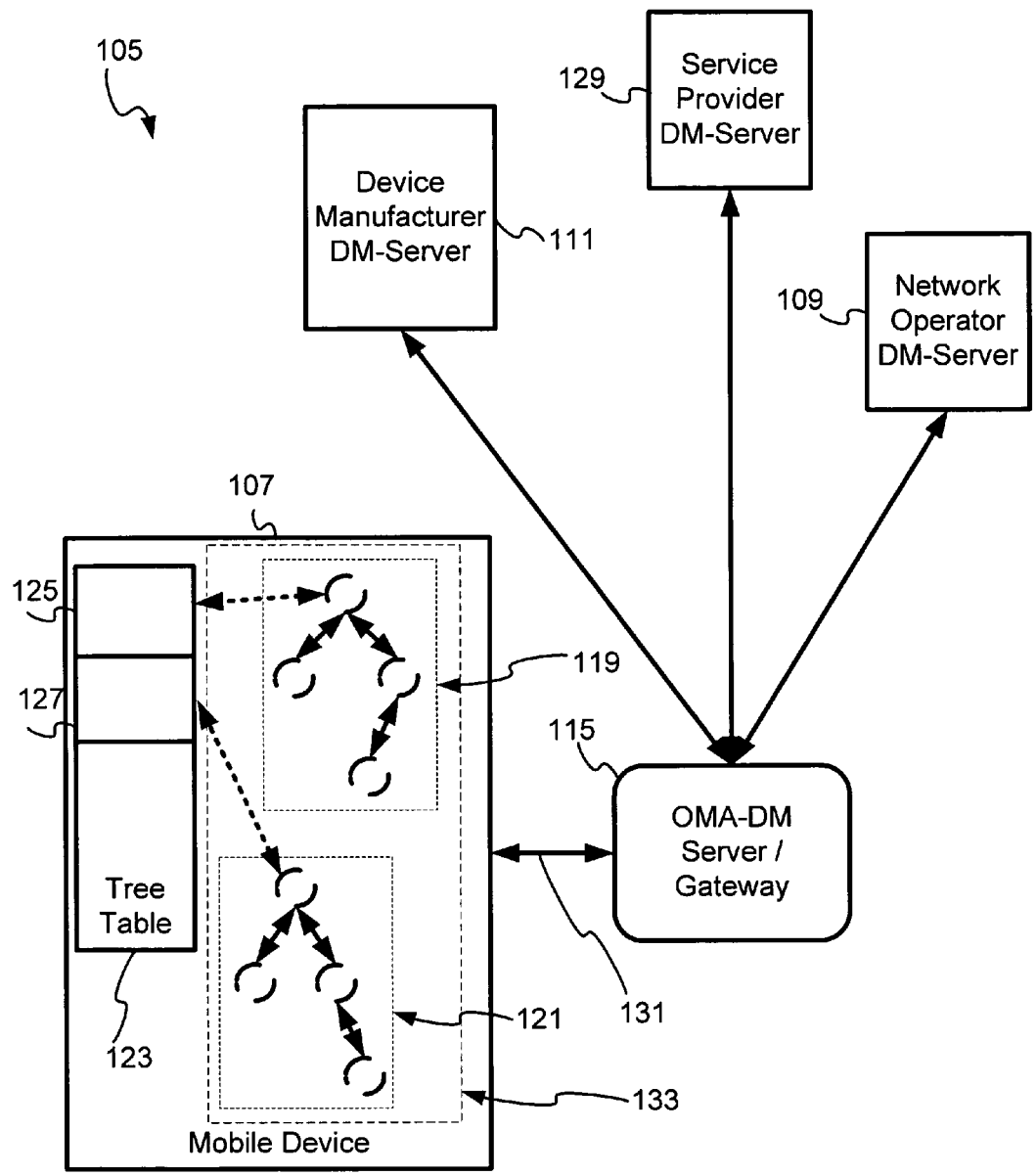
FIG. 1 is a perspective diagram of an exemplary mobile handset network that employs an Open Mobile Alliance (OMA)-compliant device management (DM) server/gateway to manage a plurality of management trees in the mobile device, in accordance with a representative embodiment of the present invention.

FIG. 1 is a perspective diagram of an exemplary mobile handset network 105 that employs an Open Mobile Alliance (OMA)-compliant device management (DM) server/gateway 115 to manage a plurality of management trees in the mobile device 107, in accordance with a representative embodiment of the present invention. In a representative embodiment in accordance with the present invention, the OMA DM server gateway 115 may, for example, support device management protocols and procedures defined by the Open Mobile Alliance (OMA). The mobile device 107 may comprise, for example, a mobile handset such as a cellular phone, a personal digital assistant (PDA), a pager, a personal computer, and a variety of similar mobile electronic devices. The mobile 107 comprises management trees 119, 121, that may comprise linked data structures of nodes representing or referencing objects and parameters used by the mobile device 107 during operation. The mobile device 107 may be communicatively coupled to the OMA DM server/gateway 115 using a wired and/or a wireless communication link such as, for example, a cellular communication network, a personal communications services (PCS) network, a paging network, a personal area network, and a wireless local area network, to name only a few. Each of the management trees 119, 121 in the mobile device 107 may be associated with and managed by a different management authority in the mobile handset network 105 such as, for example, a device manufacturer DM-server 111, a network operator DM-server 109, and a service provider DM-server 129. The device manufacturer DM-server 111, the network operator DM-server 109, and the service provider DM-server 129 are communicatively coupled to the OMA DM server/gateway 115 via a wired or wireless link. Although each of the management authorities 109, 111, 129 of FIG. 1 are shown as a separate entity, this does not represent a limitation of the present invention as any combination of the management authorities 109, 111, 129 and the OMA DM server/gateway 115 may be co-located. Each of the management authorities 109, 111, 129 and the OMA DM server/gateway 115 in the mobile handset network 105 may be capable of provisioning, replacing, modifying and/or deleting an associated one of the plurality of management trees 119, 121 in the mobile device 107.

In a representative embodiment of the present invention, a mobile electronic device such as, for example, the mobile device 107 may comprise a tree table that manages a collection of management trees, such as, for example, the tree table 123 shown in FIG. 1. A tree table such as, for example, the tree table 123 may comprise a data structure storing references to one or more device management trees. Each entry in the tree table 123 may provide a reference to the root of an associated management tree such as the management tress 119, 121, for example. The management trees 119, 121 may comprise, for example, a variety of firmware and software objects, data, and parameters related to the operation of the mobile device 107. For example, the tree table 123 of FIG. 1 has two entries, an entry 125 that refers to the management tree 119, and an entry 127 that refers to the management tree 121. The management tree 119 may, for example, be managed by a device manufacturer DM-server 111, while the management tree 121 may be managed by a network operator DM-server 109, for example. The mobile device 107 facilitates the addition of management trees to the mobile device 107 and the tree table 123 by a device management (DM) server such as, for example, the service provider DM-server 129. In addition, the OMA DM server/gateway 115 may also be capable of directly managing management trees having references located in a tree table such as, for example, the tree table 123.

Each device management server in a representative embodiment of the present invention such as, for example, the DM-servers 111, 129, 109 may manage their own management tree in the mobile device 107. A device management server in accordance with a representative embodiment of the present invention may establish public and/or private keys for public key infrastructure (PKI)-based DM interactions with the mobile device 107. In one representative embodiment in accordance with the present invention, the PKI keys may be used in a specific manner to protect the information managed by one management server from being accessed by another of the management servers. In another representative embodiment, the PKI keys may be used for end-to-end interactions between a DM client in a mobile device and a corresponding management server such as, for example, the DM-servers 111, 129, 109 of FIG. 1.

In representative embodiment of the present invention, the OMA-DM server/gateway 115 may facilitate management sessions with the mobile device 107 wherein each of the management authorities (e.g., the DM-servers 111, 129, 109) separately provision the mobile device 107, and separately and independently manage associated management trees such as management trees 119, 121, for example. In another representative embodiment, a management authority (e.g., the DM-servers 111, 129, 109) other than that normally associated with a particular management tree may access and update a management tree.

Each device management server in a representative embodiment of the present invention such as, for example, the DM-servers 111, 129, 109 may act as a management authority to manage its own management tree in the mobile device 107, and may employ a device management server such as the OMA-DM server/gateway 115, for example, to manage their respective management tree using a DM protocol such as, for example, the Sync ML DM protocol developed under the auspices of the Open Mobile Alliance (OMA). Interactions between the management authorities 111, 129, 109 and the OMA-DM server/gateway 115 may be via web service interfaces or by other means, and the DM interactions between the OMA-DM server/gateway 115 and the mobile device 107 may be via OMA-DM protocols.

In a representative embodiment in accordance with the present invention, a manufacturer of a mobile electronic device such as the mobile device 107 may, for example, install a management tree such as the management tree 119 during the manufacture of the mobile electronic device in the factory. A management tree such as, for example, the management tree 119 may also be installed in the mobile device 107 during shipping, warehousing, or other operations in the manufacturing and distribution chain of the mobile device 107. A representative embodiment of the present invention may also add an entry corresponding to the installed management tree, to a tree table such as, for example, the tree table 123 of FIG. 1. In a representative embodiment of the present invention, a DM-server such as the network operator DM-server 109, for example, may facilitate the installation of a management tree such as the management tree 121, at a point of sale (POS), or during a subsequent provisioning operation upon the mobile device 107, for example.

In a representative embodiment of the present invention, a mobile electronic device such as, for example, the mobile device 107 of FIG. 1 may maintain a set of nonces for each DM-server such as, for example, the DM-servers 111, 129, 109 with which the mobile device 107 interacts. The term "nonce" is used herein to refer to, for example, a numerical value or string that is used once, and is never again valid. In a representative embodiment of the present invention, a nonce may be used for preventing "man-in-the-middle" attacks. In particular, nonces may be used in message authentication mechanisms involving message authentication code (MAC) computations and cryptographic hash functions such as, for example, HMAC computations, when device management messages (e.g., sets of DM commands) are sent to the mobile electronic device from management servers, and results and data are returned by the mobile electronic device. In one representative embodiment of the present invention, a different pair of nonces (e.g., one each for client and server) may be maintained and used for interactions between a DM client in the mobile electronic device and the corresponding or associated device management server.

In a representative embodiment of the present invention, a mobile electronic device such as the mobile device 107 of FIG. 1 may, for example, comprise a device management forest. A device management such as the device management forest 133 forest may comprise a plurality of management trees such as, for example, the management trees 119, 121 of FIG. 1. Each management tree 119, 121 in the device management forest 133 may be managed by a different device management entity (e.g., carriers, manufacturers, service providers, etc.), and a table of references to management trees such as, for example, the tree table 123 of FIG. 1, may be maintained in the mobile device 107 by those device management entities. For example, the manufacturer of the mobile device 107 may provide a manufacturer management tree on a new mobile device such as, for example, the management tree 119, and a network operator may insert its own management tree such as, for example, the management tree 121 during a bootstrap operation. Installation of such management trees maybe accomplished, for example, via a wired or wireless communication link, and may be installed using information resident on a smart card or subscriber identity module (SIM) card.

A representative embodiment of the present invention may employ a gateway such as, for example, the OMA-DM server/gateway 115, that behaves as a protocol translator and/or data format translator during interactions with a mobile device such as the mobile device 107. A server such as the OMA-DM server/gateway 115, for example, may function similar to a wireless application protocol (WAP) gateway, and may help device management servers such as the DM-servers 111, 129, 109 to interact as an end-point, in management activities with mobile electronic devices like the mobile device 107, for example. The protocol translation and/or data format translation activity of the OMA-DM server/gateway 115 may be driven by a device management server such as the service provider DM-server 129, for example, that may be the actual end-point for interactions with the mobile device 107.

In a representative embodiment of the present invention, management authorities for more than one service provider such as, for example, the DM-servers 111, 129, 109 may manage associated nodes on a management tree of a mobile device such as the management trees 119, 121 in the mobile device 107 of FIG. 1, for example. To provide security, each service provider may have their own PKI certificate. The mobile device 107 may create, provision, and manage different management trees using, for example, a device management client for each DM-server with which the mobile device interacts, or by which it is managed such as, for example, the device management DM-server 111, the service provider DM-server 129, the network operator DM-server 109, and the OMA-DM server/gateway 115. For example, the device manufacturer DM-server 111 may be associated with the management tree 119 of FIG. 1, and may have a PKI certificate that is provided to the device manufacturer DM server 111 for authentication of accesses to the management tree 119. The tree table 123 in a representative embodiment of the present invention may be available and manageable by a device management client, for the addition, modification, updating, and deletion of management trees such as management trees 119, 121. Initialization of the tree table with the manufacturer's own tree may be performed by the manufacturer before or during distribution of the mobile device 107.

Figure 2:
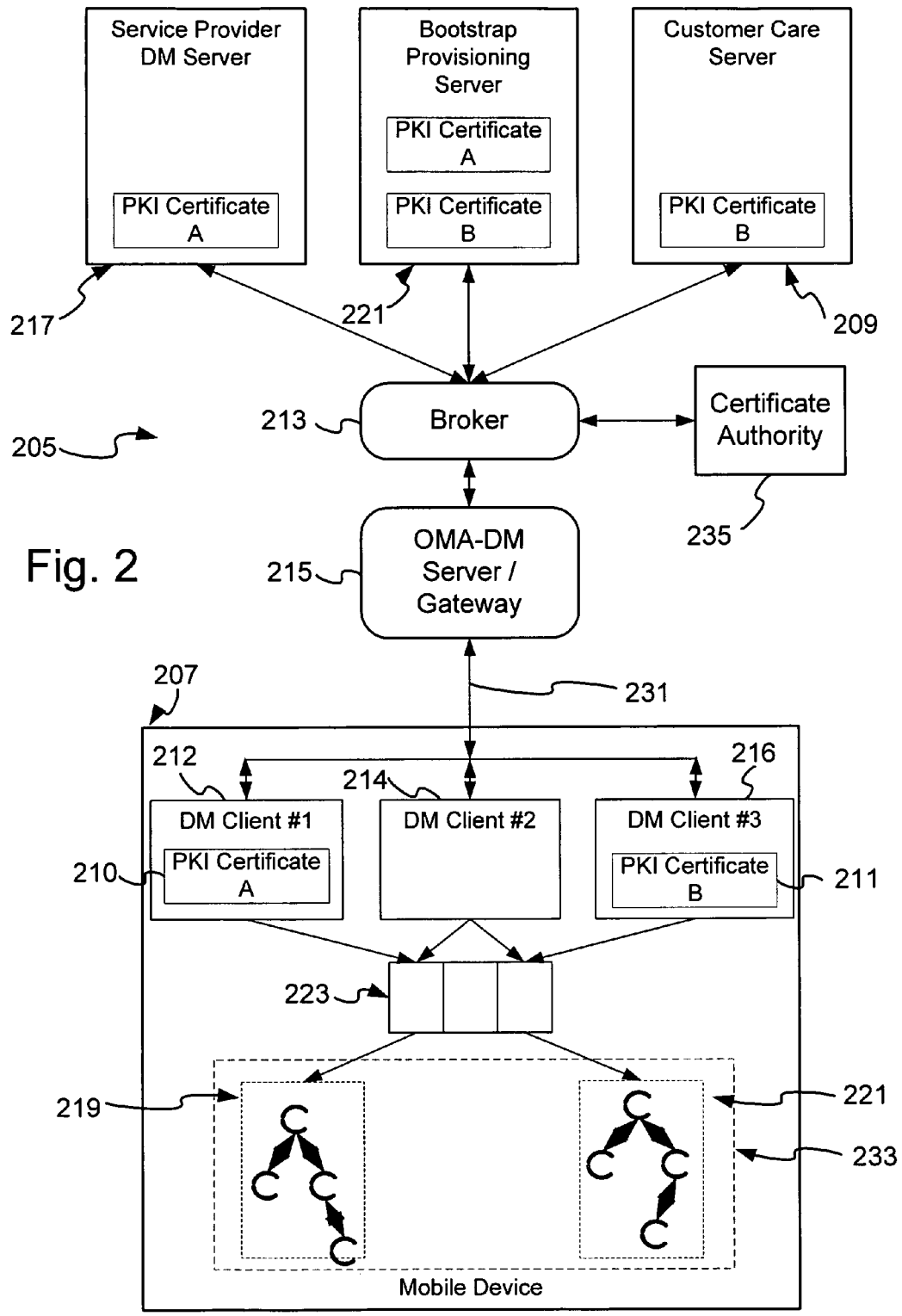
FIG. 2 is a perspective diagram of a exemplary device management network wherein a service provider DM-server employs a broker, a bootstrap provisioning server, and a customer care server to create and/or manage service-provider-associated management trees in a mobile device, in accordance with a representative embodiment of the present invention.

FIG. 2 is a perspective diagram of a exemplary device management network 205 wherein a service provider DM-server 217 employs a broker 213, a bootstrap provisioning server 221, and a customer care server 209 to create and/or manage service-provider-associated management trees 219, 221 in a mobile device 207, in accordance with a representative embodiment of the present invention. The broker 213 may interact with one or more certificate authorities 235 to retrieve and dispense digital certificates or keys to the mobile device 207, shown in FIG. 2 as PKI certificates A 210 and B 211. The broker 213 may also retrieve and dispense digital certificates or keys, as appropriate, to servers such as, for example, the OMA-DM server/gateway 215, the service provider DM-server 217, the bootstrap provisioning server 221, and/or the customer care server 209. In the example of FIG. 2, for example, the service provider DM-server 217 comprises a PKI certificate A 218, the bootstrap provisioning server 221 comprises PKI certificates A 222 and B 224, and the customer care server 209 comprises PKI certificate B 212. Although the present discussion refers to the use of PKI certificates, other suitable forms of authentication and/or authority may be employed without departing from the spirit and scope of the present invention.

In a representative embodiment of the present invention, the service provider DM-server 217 may instruct the broker 213 to create an appropriate management tree in the mobile device 207 such as, for example, the management tree 219 referenced by tree table 223. This may occur, for example, when the service provider DM-server 217 wishes to invoke a DM session via the OMA-DM gateway 215 to provide a service to/via the mobile device 207, and a management tree such as management tree 219 does not yet exist. The service provider DM-server 217 may then direct the broker 213 to provision elements of an associated management tree to enable service delivery. The service provider DM-server 217 may also instruct the broker 213 to set up a service-provider-specific digital certificate at the mobile device 207, with the help of the certificate authority 219 such as, for example, the PKI certificate A 210. The broker 213 may conduct all of these activities as specified by the service provider DM-server 217. In addition, if nonces have to be set up on either end of the session (e.g., at the mobile device 207 and the service provider DM-server 217), the broker 213 may ensure that the nonces are securely delivered to the mobile device 207, and to the service provider DM-server 217. The nonces may be stored temporarily in the mobile electronic device and in the corresponding or associated management server (or DM server, as appropriate) such that the DM-servers and DM client may securely communicate, and may have access to a previous nonce for use when messages are lost. In a representative embodiment of the present invention, a next nonce may be generated and sent with each message, by the DM client and the DM server/management servers. Nonces are normally discarded after they are replaced by newer ones—only the next nonce and the previous nonce may be stored temporarily.

In a representative embodiment of the present invention, the DM client #1 212 may be, for example, an OMA-DM protocol client that interacts with the OMA DM server/gateway 215, the DM client #2 214 may be a provisioning client that works with the Bootstrap provisioning server 221, the DM client #3 211 may be a remote diagnostics client that works with the Customer care server 209.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system supporting management of device management information in a plurality of mobile electronic devices, the system comprising:

two or more device management authorities for communicating with the plurality of mobile electronic devices and via a gateway with a service provider server employing a broker, a bootstrap provisioning server, and a customer care server, to create and manage associated device management trees in the mobile electronic device, wherein the two or more device management authorities are server computers; and each of the plurality of mobile electronic devices comprising an associated device management tree for each of the two or more device management authorities.

2. The system of claim 1 wherein each of the two or more device management authorities employ a unique set of credentials to manage associated device management trees.

3. The system of claim 1 wherein each of the two or more device management authorities interact with the device management server employing web services interfaces to manage associated device management trees.

4. The system of claim 1 wherein each of the two or more device management authorities manage a particular service accessed by the plurality of mobile electronic devices by managing associated device management trees in the plurality of mobile electronic devices.

5. The system of claim 1 wherein a device management authority not associated with a device management tree is prevented from one or more of accessing, updating, creating, deleting, and modifying the device management tree.

6. The system of claim 1 where the plurality of mobile electronic devices each comprise a device management client associated with one of the two or more device management authorities.

7. The system of claim 1 wherein each device management tree comprises one or more of a firmware object, a software object, data, and a parameter related to the operation of the associated mobile electronic device.

8. The system of claim 1 wherein the associated device management tree is created in at least one of the plurality of mobile electronic devices based in response to the service provider instructing the broker.

9. The system of claim 8 wherein elements of the associated device management tree are provisioned to enable service delivery in response to the service provider instructing the broker.

10. The system of claim 8 wherein a service-provider specific digital certificate is set up at the at least one of the plurality of mobile electronic devices in response to the service provider instructing the broker.

11. The system of claim 1 wherein the associated device management tree is created in at least one of the plurality of mobile devices when the service provider server invokes a session via the gateway to provide a service to at least one of the plurality of mobile electronic devices and the associated device management tree does not yet exist in the at least one of the plurality of mobile electronic devices.

12. A mobile electronic device comprising:
two or more device management clients, each device management client for managing objects in a device management forest comprising a plurality of associated device management trees each corresponding to different device management entities, wherein the device management entities are server computers, and wherein the associated device management trees are independent of one another and are not subtrees;
two or more credentials, each credential associated with one of the two or more device management clients; and
each device management client capable of one or more of accessing, updating, creating, deleting, and modifying objects in the associated device management trees based upon communication with an associated one of two or more device management servers using the associated one of the two or more credentials.

13. The device of claim 12 wherein the two or more credentials enable authentication of the two or more device management clients and the associated device management server.

14. The device of claim 12, further comprising:
a data structure comprising references to each of two or more device management trees.

15. The device of claim 12 wherein a device management server is enabled for one or more of accessing, updating, creating, deleting, and modifying at least two device management trees on a single mobile electronic device.

16. The device of claim 12 wherein the mobile electronic device comprises one of a mobile handset, a personal digital assistant, a personal computer, and a pager.

17. The device of claim 12 wherein each of the associated device management trees in the device management forest is managed by a different device management entity.

18. The device of claim 17 wherein the different device management entity includes at least one of carriers, manufacturers, and service providers.

19. The device of claim 12 wherein each of the associated device management trees in the device management forest is managed by a table of references to management trees, the table stored in the mobile electronic device and each table is maintained by different device management entities.

20. The device of claim 12 wherein a network operator installs a management tree in the device management forest during a bootstrap operation.

\* \* \* \* \*